Oct. 23, 1928.
C. F. ROSS
1,688,749
SPRING
Filed Aug. 29, 1925
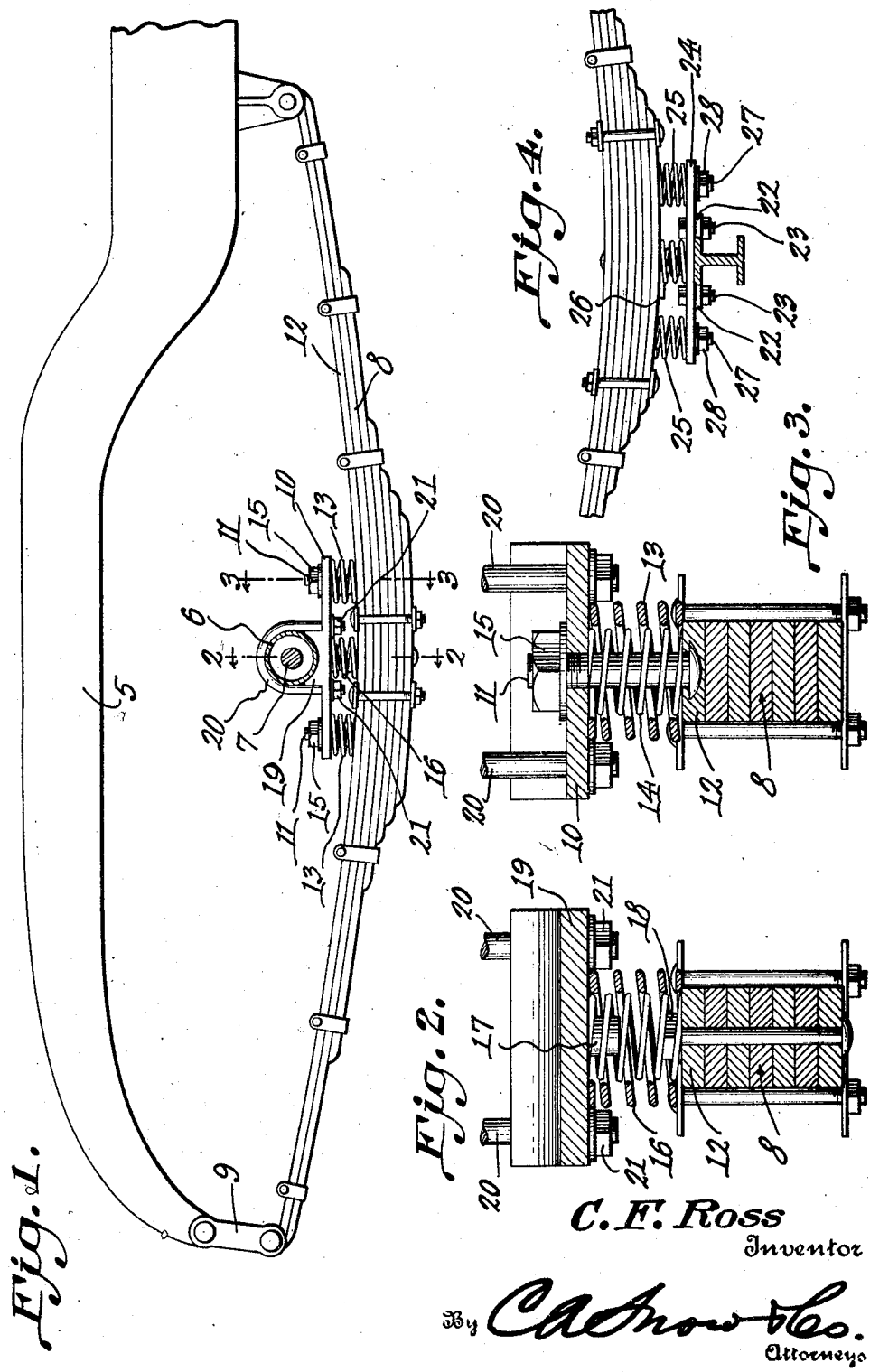
C. F. Ross
Inventor
By C. A. Snow & Co.
Attorneys Patented Oct. 23, 1928.

1,688,749

UNITED STATES PATENT OFFICE.

CHARLES F. ROSS, OF GARRETT, INDIANA.

SPRING.

Application filed August 29, 1925. Serial No. 53,386.

The present invention relates to motor vehicle springs and aims to provide a novel attachment to be employed between the spring and axle of a vehicle for adding flexibility to the spring construction to enhance the riding qualities of the vehicle.

A further object of the invention is to provide means to embrace the usual vehicle spring against the strain directed thereto caused by the rebound of the spring.

A still further object of the invention is to provide a device of this character which may be readily and easily positioned and one wherein lateral strain usually directed to the shackle bolts will be reduced to the minimum.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a spring equipped with an attachment constructed in accordance with the invention.

Figure 2 is a sectional view taken on line 2—2 of Figure 1.

Figure 3 is a sectional view taken on line 3—3 of Figure 1.

Figure 4 is a sectional view through a front axle illustrating a front spring and the attachment as positioned thereon.

Referring to the drawing in detail, the reference character 5 indicates a side rail of a motor vehicle chassis and more particularly the rear end thereof.

The reference character 6 indicates the usual axle housing, the rear axle being shown at 7 as operating therein. Mounted under the axle is a spring member 8 which is connected to the side rail 5 by means of the usual shackles 9.

The attachment forming the essence of the invention includes a plate 10 which is supplied with openings adjacent to its ends to accommodate the bolts 11 that form a part of the upper spring leaf 12, the bolts being shown as having their heads embedded within the upper leaf of the spring which are preferably positioned during the construction of the leaf.

Coiled springs are positioned around the bolts, the coiled springs being indicated at 13 and as shown, these coiled springs are relatively large so that smaller coiled springs 14 may be positioned therein. Nuts 15 are provided on the bolts and act to tension the springs to regulate the movements of the springs and adapt them for use in supporting vehicles and loads of various weights.

Arranged between the coiled springs 13 and 14, which are disposed adjacent to the ends of the plates 10, are central spring members 16 that have their upper ends encircling the lugs 17 depending from the plates 10 as clearly shown by Figure 2 of the drawing, the lower ends of the springs being positioned over the nuts 18 that pass through the central portions of the leaves of the spring to secure them together in the usual and well known manner.

Formed integral with the plates 10 which are disposed adjacent to the ends of the axle housing or axle to which the attachment is secured, are supporting blocks 19 that have their upper surfaces curved to conform to the curvature of the rear axle housing, to the end that a suitable support is provided for the axle with which the attachment is used.

Cooperating with these supporting blocks are inverted U-shaped bolts 20 that embrace portions of the upper surface of the axle housing the ends thereof passing through suitable openings formed in the plate associated therewith, where nuts such as indicated at 21 are provided for securing the inverted U-shaped bolts in position.

Thus it will be seen that due to this construction, the attachment will be securely held in position on the springs of a vehicle and will act to cushion the upward movement of the central portion of the spring associated therewith.

In the form of the invention as illustrated by Figure 4, the attachment is shown as used in connection with the front springs of a vehicle, wherein the springs rest directly on the axle and in this form of the invention it will be seen that the axle is suppled with ears indicated at 22 through which bolts 23 pass, which bolts also pass through the plates 24 that act to support the coiled springs 25 and 26 that are positioned between the spring and axle.

The springs 25 which are supported adjacent to the ends of the plates are held in position by means of the bolts 27 that also pass through openings in the plates 24 and are held in position by means of the nuts 28.

I claim:

In combination with a spring and the rear axle housing of a motor vehicle, an elongated plate, a supporting block extending upwardly from the plate and formed integral therewith, said block having a curved upper surface to receive the axle housing, an inverted U bolt embracing a portion of the axle housing and extending through the plate, bolts extending upwardly from the spring and passing through the plate adjacent to the ends thereof, coiled spring surrounding the bolts and engaging the plates and vehicle spring, coiled springs surrounding the first mentioned coiled springs and contacting with the vehicle spring and plate, and nuts on the bolts for securing the plates in position.

In testimony that I claim the foregoing as my own, I have hereto affixed my signature.

CHARLES F. ROSS